United States Patent [19]

Bradley, Jr.

[11] 4,248,486

[45] Feb. 3, 1981

[54] SPHERICAL BEARING ASSEMBLY WITH STRESS RELIEF

[75] Inventor: Charles D. Bradley, Jr., Gobles, Mich.

[73] Assignee: Pneumo Corporation, Boston, Mass.

[21] Appl. No.: 969,969

[22] Filed: Dec. 15, 1978

[51] Int. Cl.³ .............................................. F16C 23/04
[52] U.S. Cl. ...................................................... 308/72
[58] Field of Search ...................... 308/29, 61, 72, 194

[56] References Cited

U.S. PATENT DOCUMENTS

| 2,309,281 | 1/1943 | Steele | 308/72 |
|---|---|---|---|
| 2,464,492 | 3/1949 | Dimick | 308/72 |
| 2,583,382 | 1/1952 | Maas | 308/194 |
| 3,020,101 | 2/1962 | McCaslin | 308/72 |
| 3,116,539 | 1/1964 | Evans et al. | 308/72 |

FOREIGN PATENT DOCUMENTS

| 778868 | 3/1935 | France | 308/72 |
|---|---|---|---|
| 108119 | 7/1917 | United Kingdom | 308/72 |
| 424680 | 2/1935 | United Kingdom | 308/72 |

*Primary Examiner*—Richard R. Stearns
*Attorney, Agent, or Firm*—Maky, Renner, Otto & Boisselle

[57] ABSTRACT

A spherical bearing adapted for use in rod end connections and the like, characterized by an outer race member having opposite faces and a concave spherical inner race surface, and a ball-like inner member within the outer race member having a complementary convex spherical outer bearing surface. At each face of the outer race member is a pair of diametrically opposed segmental slots. The diametrically opposed slots in each face are in alignment with the slots of the other and extend transversely partially through the housing with transversely opposed slots being separated by an annular contact band which maintains substantially constant side clearance between the inner member and outer race member thereby to prevent the development of high stress concentrations in the outer race member during loading. In use, the opposed slots are necessarily aligned substantially at right angles to the line along which the bearing is subjected to loads.

8 Claims, 6 Drawing Figures

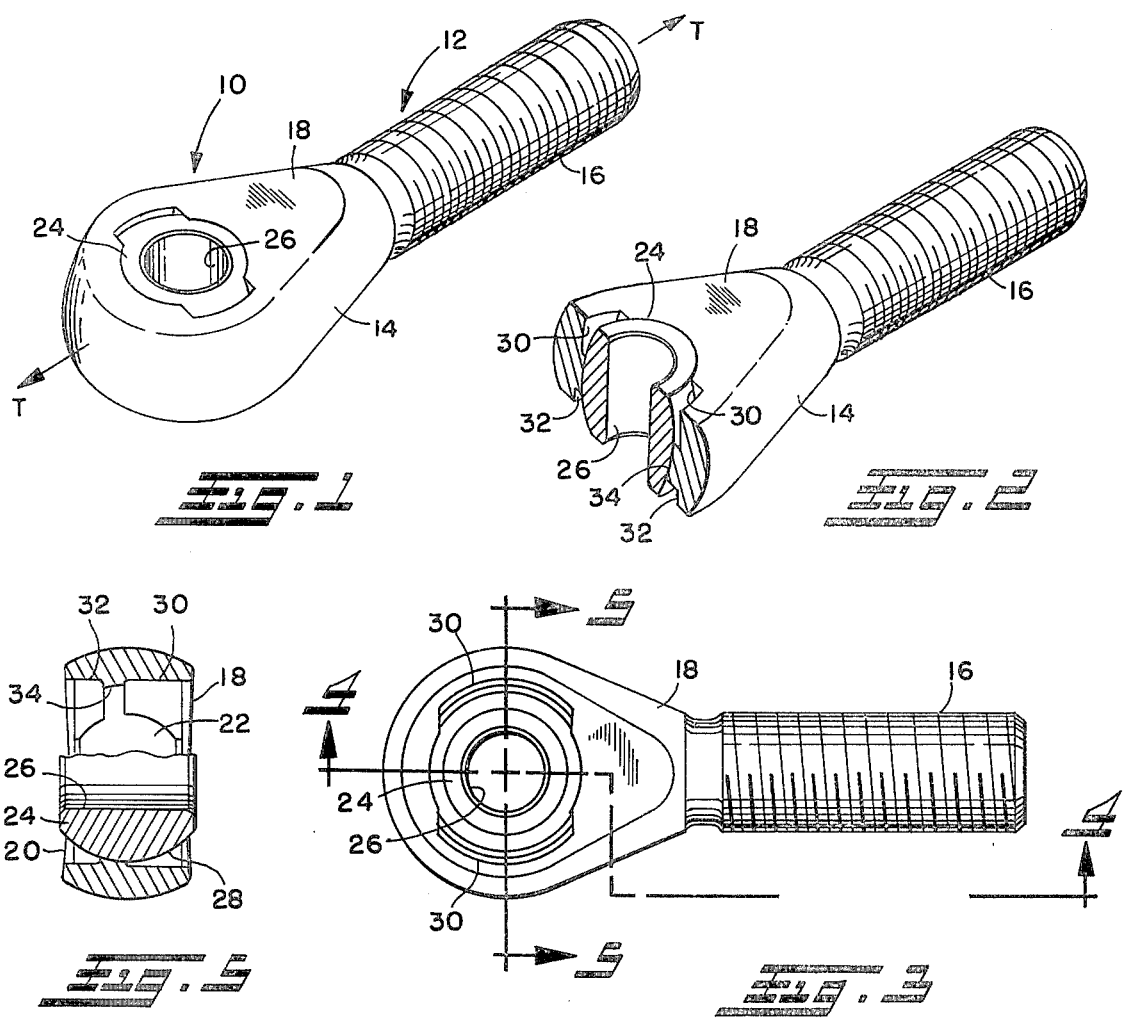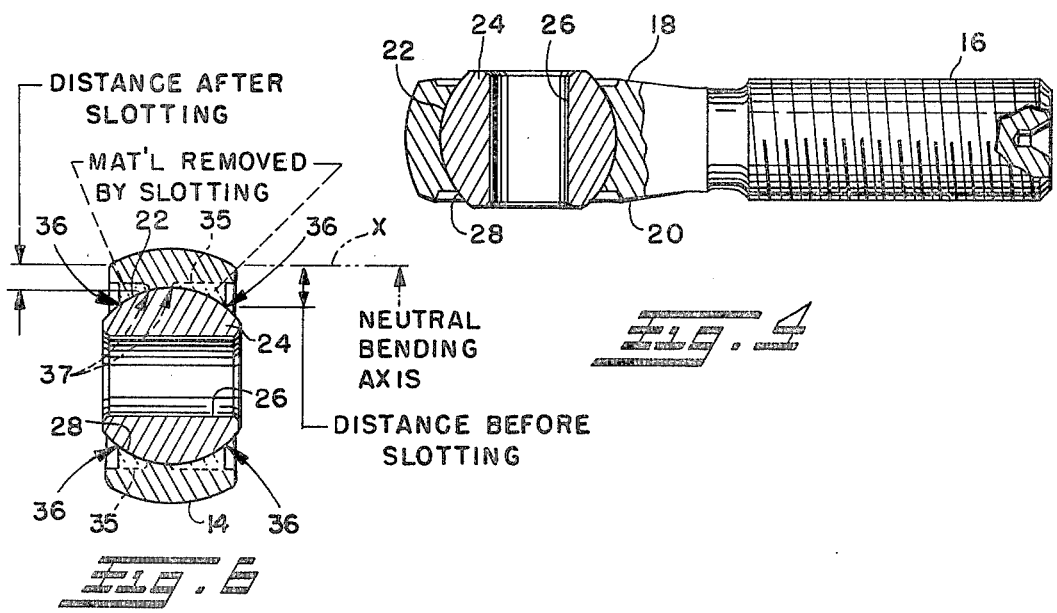

SPHERICAL BEARING ASSEMBLY WITH STRESS RELIEF

BACKGROUND OF THE INVENTION

The present invention relates generally to a spherical bearing including an outer race member or bearing housing layer a concave spherical inner race surface and a ball-like member within the outer race member having a complementary convex spherical outer bearing surface, and more particularly to such a spherical bearing utilized in a rod end connection or the like wherein the spherical bearing may be subjected to loads applied substantially along a line normal to the axis of the outer race member.

In conventional spherical bearings of the type described, there is normally provided a slight radial clearance between the race of the outer race member and the outer bearing surface of the ball-like inner member, whereby when the spherical bearing is subjected to tensile loads applied substantially along a line normal to the axis of the outer race member such as may occur when utilized in a rod end connection, the sides of the race member at right angles to such line of force will move inwardly toward the ball-like member as such clearance is taken up and the race surface of the outer race member will become somewhat oval-shaped. Such movement results in bending stress in the outer race member, in addition to the direct tensile stress resulting from the applied tensile loads, which increases with the distance from the neutral bending axis of the outer race member. This distance, and consequently the tensile stress, is greatest at the intersection of the spherical bearing race and the bearing housing 90° to the line of force, and experience has shown that fatigue failures originate at this intersection, leading to short cycle life of the outer race member and/or requiring greater fatigue strength design requirements.

Early failures of the race member may occur in spherical bearings of the type oftentimes referred to in the trade as messerschmidt-type bearing which include a bearing housing and a truncated ball, with the bearing housing being slotted to form keyhole type slots through which the ball may be inserted and withdrawn for assembly and replacement purposes. Examples of such type of bearings may be found in U.S. Pat. No. 3,116,539, dated Jan. 7, 1964 and in U.S. Pat. No. 2,309,281, dated Jan. 26, 1943. In such spherical bearings, the keyhole slots are diametrically opposed and extend either halfway or entirely across the bearing race surface of the bearing housing. In those bearings where the keyhole slots extend halfway, fatigue failures may originate at points of high stress concentration in the non-slotted portion of the bearing housing. Moreover, where the keyhole slots extend entirely across the inner bearing race surface, points of high stress concentration will develop in the bearing housing as the increased clearances resulting from the slotting are taken up during loading of the spherical bearing in the aforedescribed manner.

SUMMARY OF THE INVENTION

In accordance with the present invention, spherical bearing or outer race member cycle life may be increased by removing the portions of the bearing housing that are subject to high stress concentrations but without increasing the side clearance between the inner race surface of the race member and the outer bearing surface of the ball-like member. The race member is provided at each of its opposite faces at the sides of the eye 90° to the line of force with a pair of diametrically opposed axially extending segmental slots with the opposed slots in each face being aligned diametrically with those of the other. The diametrically opposed slots extend transversely partially across the race surface from each face with the pairs of slots on opposite faces being separated by an annular contact band which maintains substantially constant side clearance between the inner bearing race surface of the race member and the outer bearing surface of the ball-like member thereby providing side support for the ball-like member. The outer bearing housing may be formed with the slots or the slots may be subsequently machined in the bearing housing with the contact band comprising that portion of the bearing race surface left between the slots after slotting. In use, the diametrically opposed slots of each pair are aligned normal to the line of force along which tensile loads are applied. Accordingly, points of high stress concentration in the race member are eliminated without allowing further bending to occur due to the contact band which maintains substantially constant side clearance.

It is therefore a principal object of the present invention to provide a spherical bearing with stress relief.

It is another object to provide a spherical bearing in which the race member or bearing housing will not be subject to early fatigue failure.

Still another object is to provide a spherical bearing with increased practical load limit.

Yet another object is to provide such a spherical bearing that may be easily assembled or disassembled.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principles of the inventon may be employed.

BRIEF DESCRIPTION OF THE DRAWING

In the annexed drawing:

FIG. 1 is a perspective view of the preferred embodiment of spherical bearing according to the present invention as utilized in a rod end assembly;

FIG. 2 is a combined perspective and sectional view of the rod end assembly of FIG. 1;

FIG. 3 is a top plan view of the rod end assembly of FIG. 1;

FIG. 4 is a side elevation view, partially in section, of the rod end assembly taken along the plane of the line 4—4 of FIG. 3;

FIG. 5 is a transverse sectional view of the rod end assembly, taken along the plane of the line 5—5 of FIG. 3, and with the ball fragmented showing a portion of the inner race surface; and FIG. 6 is a transverse sectional view similar to FIG. 5 of the rod end assembly, without slotting.

DESCRIPTION OF THE PREFERRED EMBODIMENT

A spherical bearing embodying the concepts of the present invention is designated generally by numeral 10 in FIGS. 1-6 of the attached drawing. The bearing 10 is shown in the form of a rod end assembly 12; however, it will become apparent that the spherical bearing of the invention may have other applications. Such rod end assembly 12 and thus the spherical bearing 10, may be utilized, for example, in aircraft control linkages where the rod end assembly may be subjected along its longitudinal axis to cyclical tensile loads T shown schematically in FIG. 1.

The spherical bearing 10 comprises an outer race member or bearing housing 14 which may be formed integrally with the rod 16, or formed separately and assembled therein as desired. The race member 14 has opposite planar faces 18 and 20 and a concave spherical inner bearing race surface 22 which forms the eye of the race member 14. The spherical bearing 10 further comprises an inner ball-like member 24 housed within the race member 14. The ball-like member 24 is similar to those found in prior art forms of spherical bearings and essentially has the shape of a truncated ball with central bore 26 and a convex spherical outer surface 28 which is complementary to and has a radius slightly less than that of the concave inner race surface 22 of the race member 14.

In accordance with the present invention, the race member 14 is provided with two pairs of diametrically opposed slots 30 and 32 respectively at each of the faces 18 and 20. The slots 30 and 32 of each pair are aligned diametrically at right angles to the direction of the applied tensile loads T for reasons that will become more apparent below. Preferably, the slots 30 and 32 are cylindrical segmental cavities with a radius approximately that of the ball 24 and may be machined or formed into the eye of the race member 14 as shown. The slots 30 and 32 extend transversely partially across the bearing race surface with transversely opposed slots of opposite pairs being separated by an annular contact band 34 at each side of the race member. The annular contact band 34 consists of that portion of the bearing race surface left between the transversely opposed slots after slotting and thus is a continuation of such race surface. The side clearance between the inner bearing race surface 22 and outer spherical surface 28 of the ball 24 is thereby not increased by the slotting. Although the race member is described as being machined and/or formed, it of course may be cast in the desired shape.

In the preferred embodiment shown, the slots 30 of one pair preferably extend approximately halfway across the bearing race surface whereas the slots 32 of the other pair extend only partially halfway, or approximately ⅓ the way across the bearing race surface, leaving a contact band 34 of approximately 1/6 the axial length of the bearing housing. The chordal width of the slots 30 is also at least as great as the axial length or thickness of the ball-like member 24 whereby the spherical bearing 10 may be conventionally assembled by inserting the ball-like member edgewise through slots 30 and rotating the same to the position shown in FIG. 1. Of course, the spherical bearing may be assembled by other methods with the contact band axially offset as shown or centrally disposed in the race member if preferred.

Turning now to FIG. 6, the stress relief function of the invention will be appreciated. There is shown in FIG. 6 a sectional view of the race member 14 taken along a diametrical plane thereof normal to the direction of the applied tensile loading indicated by arrows T in FIG. 1 with that portion of the race member 14 normally eliminated by slotting being outlined by dashed line 35. Hence, the combined sectioned area of the race member is illustrative of the race member without slotting in accordance with the invention, and thus without stress relief. As such race member is subjected to tensile loads, the sides of the race member at right angles to the line of applied force (at the top and bottom of the race member as seen in FIG. 6) will move laterally inwardly as any clearance between the inner race surface of the race member and outer surface of the ball-like member is taken up. Such inward movement results in bending stress in the race member which combines with the direct tensile stress to create areas of high stress concentration. Moreover, the stress from bending increases the greater the distance from the neutral bending axis X and is additive with the direct tensile stress inwardly of the neutral bending axis. Accordingly, points of maximum tensile stress occur at the intersection of the periphery of the race surface and the diametrical plane extending at right angles to the direction of the applied force indicated at 36. In addition, the portions of the race member adjacent these points of highest stress concentration are also subjected to high stress concentrations.

The removal of these portions of high stress concentration by slotting at 30 and 32 in the manner previously described greatly reduces the maximum tensile force because the points of maximum stress concentration will then occur at the radial innermost edges 37 of the remaining contact band 34 whose distance from the neutral bending axis X is much less as shown. Moreover, as previously indicated, the presence of the contact band is important so that the clearance between the inner race surface of the race member and outer surface of the ball-like member is not increased by such slotting, such contact band maintaining such clearance and providing the required support for the ball in the region of the slots 90° to the line of the applied force. An increase in side clearance would allow for greater bending resulting in the development of high stress concentrations in additional portions of the race member, thus nullifying the benefits derived from removal of the portions of the bearing housing normally subject to the high stress.

Although the invention has been shown and described with respect to a certain preferred embodiment, it is obvious that equivalent alterations and modifications will occur to others skilled in the art upon the reading and understanding of the specification. The present invention includes all such equivalent alterations and modifications and is limited only by the scope of the claims.

The embodiments of the invention in which an exclusive property or privilege is claimed are defined as follows:

1. A spherical bearing assembly including an outer race member having opposite faces and a concave spherical inner race surface, and an inner ball-like member having a complimentary convex spherical outer bearing surface, said outer race member having diametrically opposed slots in each said face thereof with the opposed slots in each said face being substantially aligned diametrically with those of the other, said diametrically opposed slots extending transversely partially across said race surface, and an annular contact band having a radius substantially corresponding to the radius of said race surface between said slots in each said face, the slots in one of said faces extending approximately halfway across said race surface, and the slots in the other of said faces extending approximately one-third the way across said race surface leaving an annular contact band between said opposed slots in each said face of approximately one-sixth the axial length of said race surface.

2. The spherical bearing assembly of claim 1 wherein said contact band is a continuation of said race surface.

3. A spherical bearing assembly including an outer race member having opposite faces and a concave spherical inner race surface, and an inner ball-like member having a complementary convex spherical outer bearing surface, said outer race member having diametrically opposed slots in each said face thereof with the opposed slots in each said face being substantially aligned diametrically with those of the other, said diametrically opposed slots extending transversely partially across said race surface axially inwardly of portions of said bearing surface to prevent the development of stress concentrations in said outer race member in the region of said slots, the slots in one of said faces extending approximately halfway across said race surface and the slots in the other of said faces extending less than halfway across said race surface thus leaving an annular contact band separating the aligned slots of opposite faces having a radius substantially corresponding to the radius of said race surface between said opposed slots in each said face.

4. The spherical bearing assembly of claim 3 wherein said contact band is a continuation of said race surface.

5. The spherical bearing assembly of claim 3 wherein said diametrically opposed slots are cylindrical segmental slots.

6. The spherical bearing assembly of claim 3 wherein said bearing assembly includes means through which a load is applied to said bearing assembly along a diameter of said outer race member with said slots located approximately 90° to such diameter.

7. The spherical bearing assembly of claim 3 wherein said ball-like member is a truncated ball and the slots in one of said faces are cylindrical segmental slots having a radius greater than the radius of said truncated ball.

8. A spherical bearing assembly including an outer race member having opposite faces and a concave spherical inner race surface, and an inner ball-like member having a complementary convex spherical outer bearing surface, said outer race member having diametrically opposed slots in each said face thereof with the opposed slots in each said face being substantially aligned diametrically with those of the other, said diametrically opposed slots extending transversely partially across said race surface axially inwardly of portions of said bearing surface to prevent the development of stress concentrations in said outer race member in the region of said slots, the aligned slots of opposite faces being separated by an annular contact band having a radius substantially corresponding to the radius of said race surface between said opposed slots in each said face, said annular contact band having an axial length of approximately one-sixth the axial length of said race surface.

* * * * *